US008433799B2

(12) United States Patent
Ohta et al.

(10) Patent No.: US 8,433,799 B2
(45) Date of Patent: Apr. 30, 2013

(54) COMMUNICATION CONTENTION MANAGEMENT DEVICE, AUXILIARY COMMUNICATION CONTENTION MANAGEMENT DEVICE, COMMUNICATION CONTENTION MANAGEMENT SYSTEM, AND COMMUNICATION CONTENTION MANAGEMENT METHOD

(75) Inventors: Ken Ohta, Yokohama (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 427 days.

(21) Appl. No.: 12/876,780

(22) Filed: Sep. 7, 2010

(65) Prior Publication Data
US 2011/0060839 A1 Mar. 10, 2011

(30) Foreign Application Priority Data

Sep. 7, 2009 (JP) ................ P2009-206420
Sep. 6, 2010 (JP) ................ P2010-199198

(51) Int. Cl.
*G06F 15/173* (2006.01)
(52) U.S. Cl.
USPC ............................ 709/225; 709/203; 709/229
(58) Field of Classification Search .................. 709/203, 709/225, 229
See application file for complete search history.

(56) References Cited

U.S. PATENT DOCUMENTS

| 6,496,847 B1 | 12/2002 | Bugnion et al. |
| 7,342,906 B1 * | 3/2008 | Calhoun ..................... 370/338 |
| 7,529,861 B2 | 5/2009 | Ohta et al. |
| 8,156,246 B2 * | 4/2012 | Short et al. .................... 709/239 |
| 8,209,400 B2 * | 6/2012 | Baum et al. ................... 709/218 |
| 2003/0217150 A1 * | 11/2003 | Roese et al. .................. 709/225 |
| 2006/0179259 A1 | 8/2006 | Kershaw et al. |
| 2009/0138596 A1 * | 5/2009 | Song ............................. 709/225 |
| 2010/0029215 A1 | 2/2010 | Honkanen et al. |
| 2012/0059876 A1 * | 3/2012 | Chinta et al. ................. 709/203 |

FOREIGN PATENT DOCUMENTS

| JP | 2003-196151 | 7/2003 |
| JP | 2005-50367 | 2/2005 |
| JP | 2006-216012 | 8/2006 |
| JP | 2008-521309 | 6/2008 |
| WO | WO 2006/119471 A2 | 11/2006 |
| WO | WO 2008/157449 A1 | 12/2008 |
| WO | WO 2009/059962 A1 | 5/2009 |

OTHER PUBLICATIONS

Office Action issued Nov. 8, 2011, in Japanese Patent Application No. 2010-199198 with English translation.

* cited by examiner

*Primary Examiner* — Michael Won
(74) *Attorney, Agent, or Firm* — Oblon, Spivak, McClelland, Maier & Neustadt, L.L.P.

(57) ABSTRACT

The communication contention management device of the present invention includes a connection request receiving unit to receive a connection request to the access point form the auxiliary communication contention management device, an access restriction unit to hold an identifier of the execution environment and an access restriction policy containing a designation of the access point to which the execution environment is allowed or not allowed to be connected and determine whether or not to permit the connection request according to the access restriction policy, and a contention determination unit to determine whether or not to permit the connection request based on an active state and an allocation state held in a connection manager.

21 Claims, 7 Drawing Sheets

FIG. 2A

| CONNECTION RESOURCE | ACTIVE STATE | ALLOCATION |
|---|---|---|
| CELLULAR 1 | ACTIVE | APN_A |

FIG. 2B

| CONNECTION RESOURCE | ACTIVE STATE | ALLOCATION | IDENTIFIER OF EXECUTION ENVIRONMENT |
|---|---|---|---|
| CELLULAR 1 | ACTIVE | APN_A | 1 |
| CELLULAR 2 | ACTIVE | N/A | |
| WIRELESS LAN1 | ACTIVE | AP_B | 1 |

FIG. 3

| DESTINATION | PRIORITY |
|---|---|
| APN_A | 1 |
| APN_B | 2 |
| APN_C | 3 |

FIG. 4

| EARLIER CONNECTION \ LATER CONNECTION | APN_A | APN_B | APN_C |
|---|---|---|---|
| APN_A |  | EARLIER FIRST | LATER FIRST |
| APN_B | LATER FIRST |  | LATER FIRST |
| APN_C | EARLIER FIRST | EARLIER FIRST |  |

FIG. 5A

| IDENTIFIER OF EXECUTION ENVIRONMENT | TIME OF ADDING | DESTINATION | PRIORITY |
|---|---|---|---|
| 1 | 200907170614 | APN_B | 3 |

FIG. 5B

| IDENTIFIER OF EXECUTION ENVIRONMENT | TIME OF ADDING | DESTINATION | PRIORITY |
|---|---|---|---|
| 2 | 200907170616 | APN_A | 1 |
| 3 | 200907170620 | APN_B | 3 |

FIG. 9

| IDENTIFIER OF EXECUTION ENVIRONMENT | DESTINATION TO BE PROHIBITED | DESTINATION TO BE PERMITTED |
|---|---|---|
| 2 | APN_B,APN_C | N/A |
| 3 | N/A | N/A |

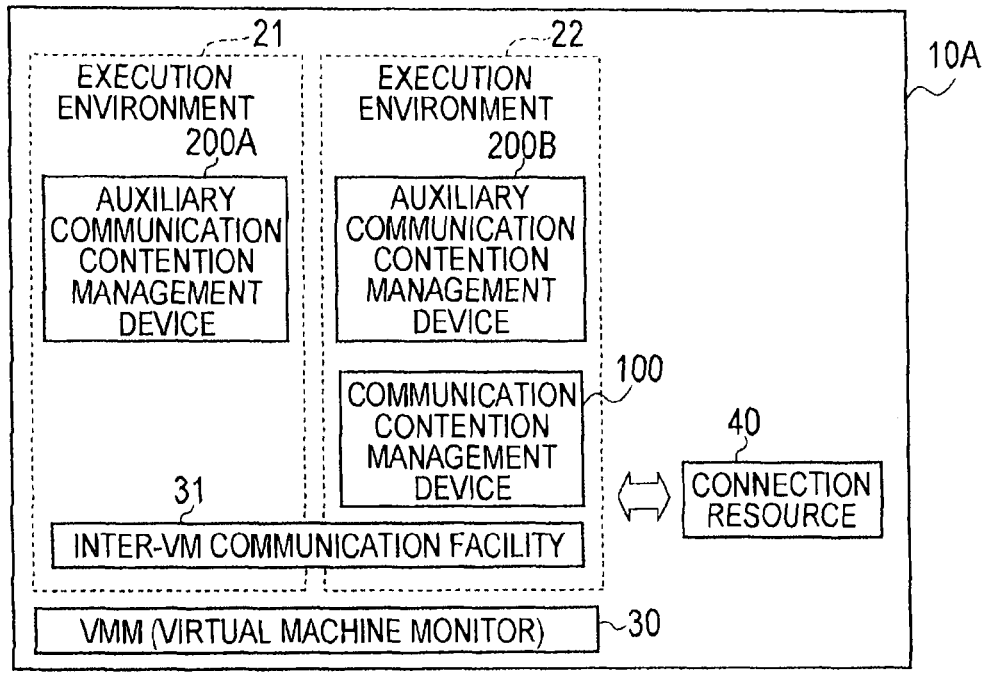
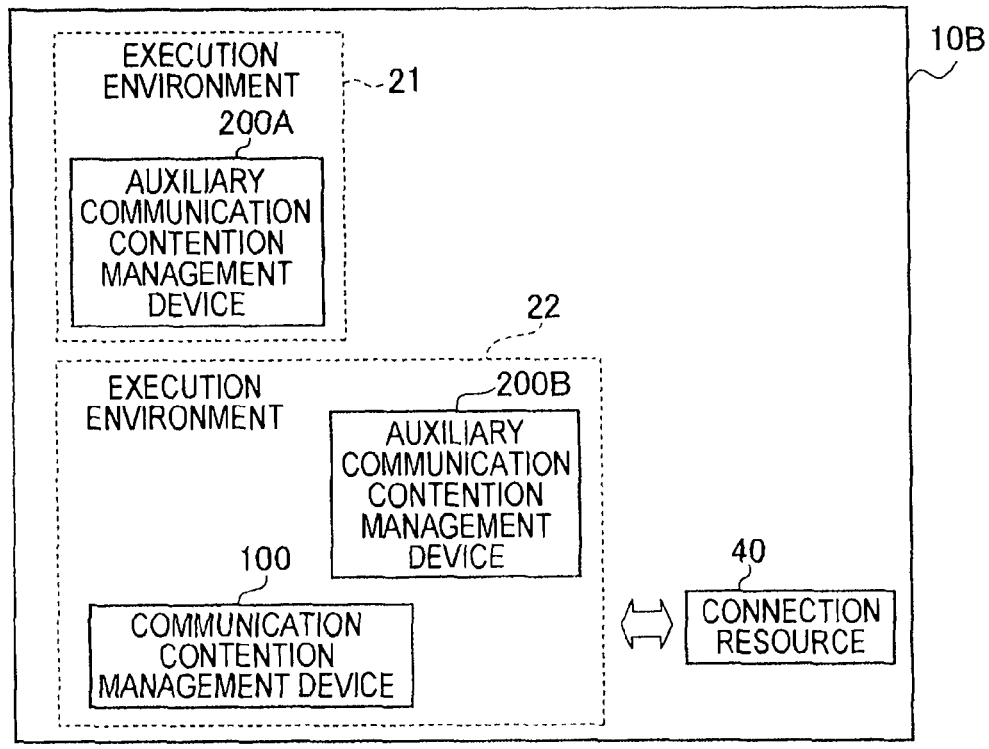

COMMUNICATION CONTENTION MANAGEMENT DEVICE, AUXILIARY COMMUNICATION CONTENTION MANAGEMENT DEVICE, COMMUNICATION CONTENTION MANAGEMENT SYSTEM, AND COMMUNICATION CONTENTION MANAGEMENT METHOD

BACKGROUND OF THE INVENTION

1. Field of the Invention

The present invention relates to a communication contention management device, an auxiliary communication contention management device, and a communication contention management system each provided in a communication terminal having multiple program execution environments and a connection resource to be used for connection to an access point to a communication network, and a communication contention management method.

2. Description of the Related Art

A mobile telephone terminal and a FDA or PC with a communication function (hereinafter, referred to as a communication terminal) are connectable to an access point by designating an access point name (APN) in a cellular communication and also connectable to an access point by designating a service set identifier (SSID) as an access point identifier in a wireless LAN. A communication terminal can selectively use communication services of different service providers by switching between connections to different access points. Similarly, even when one service provider provides multiple communication services respectively having different access points, a communication terminal can selectively use the communication services by switching between connections to the access points.

For such communication terminal, proposed is an arbitration method to deal with a case where a contention occurs between requests to connect to an access point by using a connection resource such as a radio transmitter-receiver unit (see, for example, International Patent Publication No. WO2006/119471).

Specifically, when a connection resource needed for a connection request from a program, such as an application program, is unavailable, the connection request is suspended without being executed. Then, when the connection resource becomes available, the connection resource is preferentially allocated to the program. More specifically, even when a connection request made by a first program (for example, a data communication application program) is suspended and thereafter a connection request needing to use the same connection resource is made by a second program (for example, a GPS application), the use of the connection resource is restricted in such a manner that the connection resource is not allocated to the second program. Furthermore, International Patent Publication No. WO2006/119471 discloses that a connection resource is allocated according to a priority given to each application program.

Meanwhile, there has been recently known a method of providing such a communication terminal as above with a so-called virtual machine monitor (VMM) that is software or hardware allowing multiple operating systems (OSs) to run in parallel. Multiple program execution environments can be provided on the VMM and multiple processes are executed in parallel in the multiple execution environments. This configuration is referred to as a hypervisor-type virtualization terminal architecture. In this architecture, there is a case where a secure execution environment and an insecure execution environment coexist in one communication terminal. The insecure execution environment means herein, for example, an execution environment in which software can be installed and executed by a third party.

The execution environments can communicate with each other by using an inter-virtual machine communication facility (hereinafter an inter-VM communication facility). Thus, the inter-VM communication facility can be also used for arbitration for a case where a contention occurs between connection requests.

Specifically, an auxiliary communication contention management device provided in each of multiple execution environments using the connection resource receives a connection request from the execution environment. The auxiliary communication contention management device issues a connection request to a communication contention management device which manages a contention in the entire system. The communication contention management device permits the connection request when the connection resource needed for the connection request is available. When there is a security policy for access restriction to prohibit a certain execution environment from connecting to a particular access point, the communication contention management device determines permission or rejection for the connection request according to the security policy, and restricts the access.

However, when the conventional arbitration method dealing with a case where a contention occurs between connection requests is used in the hypervisor-type virtualization terminal architecture, the following problems are observed.

Firstly, when the communication contention management device runs on the insecure execution environment, the attack of malicious software causes the access restriction to be invalidated or bypassed. This may bring about a security problem that a certain execution environment establishes a connection to an access point despite of the prohibition by the security policy, and also another security problem that malicious software in the insecure execution environment occupies the connection by exclusively using the connection resource.

Secondly, to maintain the security, it is desirable that the communication contention management device should run on a secure execution environment isolated from an insecure execution environment in a communication terminal having multiple execution environments. However, in the case where the auxiliary communication contention management device of a connection requestor and the communication contention management device operate in the different execution environments, a changeover between the execution environments and inter-VM communications for a connection request go for nothing if the connection request is rejected due to a contention for the connection resource.

This results in the waste of system resources (such as a battery and a CPU capability). Furthermore, every time the contention state for the connection resource is changed, the communication contention management device may notify the auxiliary communication contention management device that the contention state is changed. However, such notification also results in the waste of the system resources.

Accordingly, an object of the present invention is to provide a communication contention management device, an auxiliary communication contention management device, a communication contention management system, and a communication contention management method which are capable of proper access restriction in a communication terminal having multiple program execution environments and a connection resource to be used for connection to an access point to a communication network, the access restriction prohibiting a certain execution environment from connecting to a particular access point according to a security policy, and which also are capable of preventing system resources from being wasted by a needless changeover or communication between execution environments.

SUMMARY OF THE INVENTION

To solve the above-described problems, the present invention has the following aspects. A first aspect of the invention provides a communication contention management device (a communication contention management device 100) provided in a communication terminal (a communication terminal 10) having multiple program execution environments (execution environments 11, 21, and 22) and a connection resource (a connection resource 40) to be used for connection to an access point (an access point 50) to a communication network (a communication network 60). The communication contention management device includes a connection manager (a connection manager 101) configured to hold an active state indicating if the connection resource is connectable to the access point and an allocation state indicating an allocation of the connection resource to the access point; a connection request receiving unit (a connection request receiving unit 103) configured to receive a connection request to the access point from an auxiliary communication contention management device (an auxiliary communication contention management device 200A) which is provided in the execution environment (for example, the execution environment 21) different from the execution environment (the execution environment 11) in which the communication contention management device is provided; an access restriction unit (an access restriction unit 113) configured to hold an identifier of the execution environment and an access restriction policy containing a designation of an access point to which the execution environment is allowed to be connected or an access point to which the execution environment is prohibited from being connected and determine whether or not to permit the connection request according to the access restriction policy; a contention determination unit (a contention determination unit 105) configured to determine whether or not to permit the connection request based on the active state and the allocation state held in the connection manager and transmit a connection response containing a determination result to the auxiliary communication contention management device.

A second aspect of the invention provides an auxiliary communication contention management device (for example, an auxiliary communication contention management device 200A) provided in any of program execution environments (for example, an execution environment 21) included in a communication terminal connectable to an access point (an access point 50) to a communication network using a connection resource (a connection resource 40). The auxiliary communication contention management device includes an AP connection request receiving unit (an AP connection request receiving unit 201) configured to receive a connection request to the access point from the program in the execution environment; a connection request control unit (a connection request control unit 207) configured to determine whether or not to issue the connection request received by the AP connection request receiving unit by referring to a control flag set when the connection request is rejected and cancel a setting of the control flag when a connectable notification is received from a communication contention management device provided in an execution environment different from an execution environment in which auxiliary communication contention management device is provided; a connection request unit (a connection request unit 205) configured to issue the connection request received by the AP connection request receiving unit for a communication contention management device (a communication contention management device 100) provided in an execution environment (an execution environment 11) different from the execution environment in which the auxiliary communication contention management device is provided; a control flag manager (a control flag manager 209) configured to set the control flag when the connection request issued by the connection request unit is rejected by the communication contention management device; and a connection response unit (a connection response unit 203) configured to transmit a connection response for the connection request to the program having made the connection request based on a determination result as to whether or not to issue the connection result or a determination result as to whether the connection request is permitted by the communication contention management device.

A third aspect of the invention provides a communication contention management system which includes an auxiliary communication contention management device provided in any of program execution environments included in a communication terminal connectable to an access point to a communication network using a connection resource and a communication contention management device provided in an execution environment different from the execution environment in which the auxiliary communication contention management device is provided. The communication contention management system comprises a connection manager configured to hold an active state indicating if the connection resource is connectable to the access point and an allocation state indicating an allocation of the connection resource to the access point; a connection request receiving unit configured to receive a connection request to the access point from auxiliary communication contention management device; an access restriction unit configured to hold an identifier of the execution environment and an access restriction policy containing a designation of an access point to which the execution environment is allowed to be connected or an access point to which the execution environment is prohibited from being connected and determine whether or not to permit the connection request according to the access restriction policy; a contention determination unit configured to determine whether or not to permit the connection request based on the active state and the allocation state held in the connection manager and transmit a connection response containing a determination result to the auxiliary communication contention management device. The auxiliary communication contention management device includes an AP connection request receiving unit configured to receive a connection request to the access point from a program in the execution environment in which the auxiliary communication contention management device is provided; a connection request control unit configured to determine whether or not to issue the connection request received by the AP connection request receiving unit by referring to a control flag set when the connection request is rejected; a connection request unit configured to issue the connection request received by the AP connection request receiving unit to a communication contention management device provided in the execution environment different from the execution environment in which the auxiliary communication contention management device is provided; a control flag manager configured to set the control flag when the connection request issued by the connection request unit is rejected by the communication contention management device; and a connection response unit configured to transmit a connection response for the connection request to the program having made the connection request.

A fourth aspect of the invention provides a communication contention management method using an auxiliary communication contention management device provided in any of program execution environments included in a communication terminal connectable to an access point to a communication network using a connection resource and a communication contention management device provided in an execution environment different from the execution environment in which the auxiliary communication contention management device is provided. The method includes the steps of: the auxiliary communication contention management device receiving a connection request to the access point from a program in the execution environment in which the auxiliary communication contention management device is provided; the communication contention management device receiving a connection request to the access point from the auxiliary communication contention management device; the communication contention management device determining whether or not to permit the connection request according to an access restriction policy containing a designation of an access point to which the execution environment is allowed to be connected or an access point to which the execution environment is prohibited from being connected, the communication contention management device holding an identifier of the execution environment and the access restriction policy; and the communication contention management device determining whether or not to permit the connection request based on an active state indicating if the connection resource is connectable to the access point and an allocation state indicating an allocation of the connection resource to the access point and transmitting a connection response containing a determination result to the auxiliary communication contention management device.

BRIEF DESCRIPTION OF THE DRAWINGS

FIGS. 2A and 2B are views, each showing one example of management information which is held by a connection manager 101 according to the embodiment of the invention.

FIG. 3 is a view showing a specific example of priorities for destinations according to the embodiment of the invention.

FIG. 4 is a view showing a specific example of a communication contention management table according to the embodiment of the invention.

FIGS. 5A and 5b are views, each showing a specific example of a notification list according to the embodiment of the invention.

FIG. 9 is a view showing an access restriction policy according to the embodiment of the invention.

FIG. 10 is a general block configuration diagram showing a communication terminal 10A according to a modification of the invention.

FIG. 11 is a general block configuration diagram showing a communication terminal 10B according to another modification of the invention.

DESCRIPTION OF THE PREFERRED EMBODIMENTS

Figure 1:
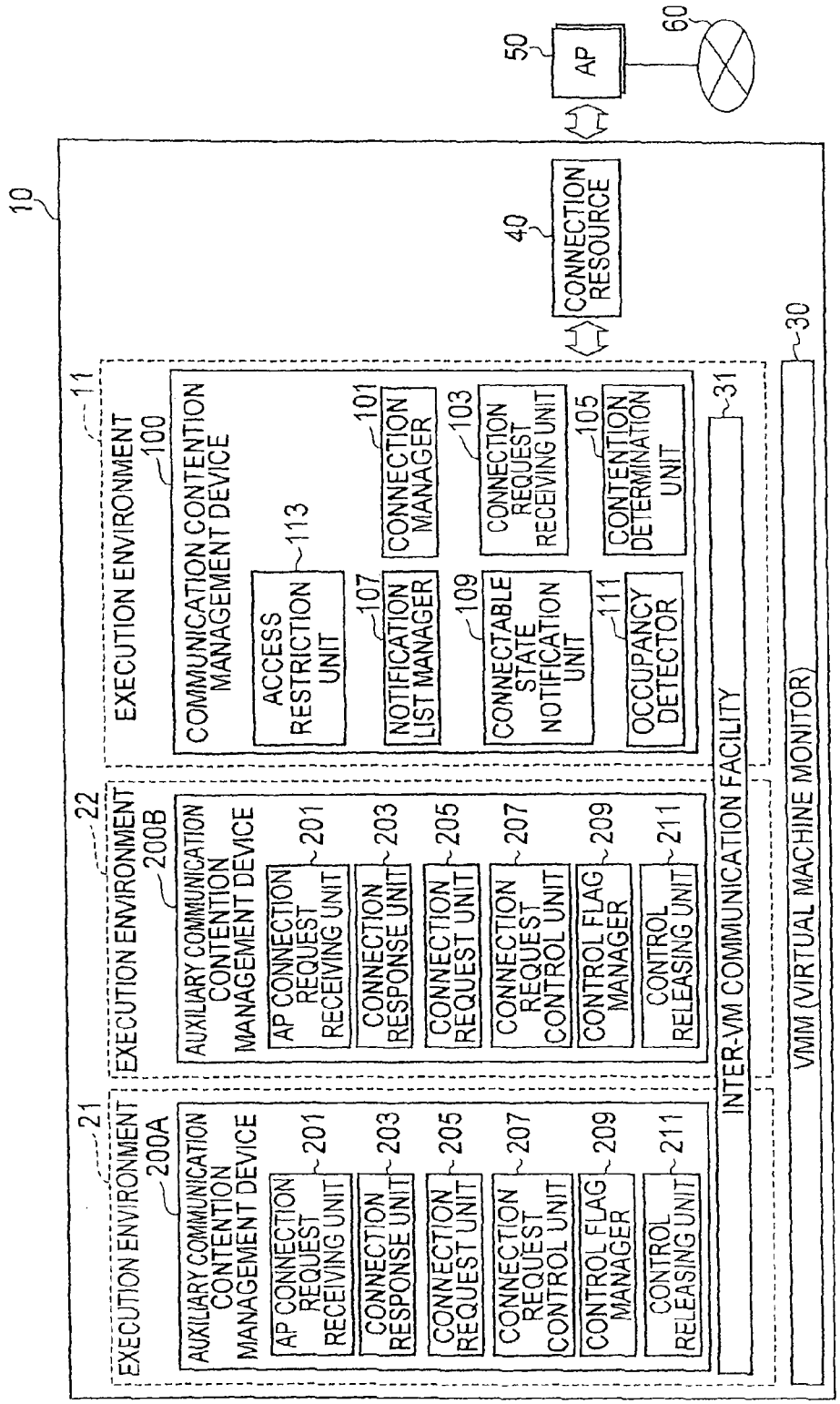
FIG. 1 is a general block configuration diagram showing a communication terminal 10 according to an embodiment of the invention.

Hereinafter, an embodiment of the present invention is described. Specifically, the description is given of (1) General Schematic Configuration of Communication Terminal, (2) Configuration of Communication Contention Management Device, (3) Configuration of Auxiliary Communication Contention Management Device, (4) Communication Contention Management Method, (5) Advantageous Effects, and (6) Other Embodiments.

In the following description of the drawings, same or similar reference numerals are given to denote same or similar portions. However, it should be noted that the drawings are schematic and ratios of dimensions and the like are different from actual ones.

Therefore, specific dimensions and the like should be determined by taking into consideration the following description. Moreover, as a matter of course, also among the drawings, there are included portions in which dimensional relationships and ratios are different from each other.

(1) General Schematic Configuration of Communication Terminal

FIG. 1 is a general block configuration diagram showing a communication terminal 10 according to an embodiment of the invention. As shown in FIG. 1, the communication terminal 10 has multiple execution environments (execution environments 11, 21, and 22) of a program. Based on a connection request from a program (for example, a data communication application program or a voice call application program) to an access point 50, the communication terminal 10 can be connected to an access point 50 corresponding to the connection request.

The communication terminal 10 includes a virtual machine monitor 30 (hereinafter a VMM 30) which is software or hardware in which multiple operation systems (OS) can be operated in parallel on one CPU (unillustrated). It should be noted that means for achieving the multiple execution environments is not limited to such virtualization but may be a host-type virtual machine or a multi-CPU.

The execution environments 11, 21, and 22 can be implemented in the communication terminal 10 as an operating system, a device driver, an application or middleware. Similarly, the execution environments 11, 21, and 22 may be implemented in the communication terminal 10 as hardware. This embodiment uses a hypervisor-type virtualized terminal architecture in which processes in respective execution environments can be executed in parallel on the VMM 30.

The respective execution environments can communicate using an inter-VM communication facility 31.

The communication terminal 10 includes a connection resource 40 to be used for connection to an access point 50 to a communication network 60. The connection resource 40 is, for example, a radio transmitter-receiver unit to be used for connection to the access point 50, such as a cellular communication network or a wireless LAN, or a communication interface corresponding to a wired LAN. The access point 50 is a network device which is designated by an Access Point Name (APN) of the cellular communication network or an identifier such as SSID of the wireless LAN. The access point 50 may include an access point of a wired communication method accessible to the communication network 60.

In this embodiment, the communication terminal 10 has the execution environment 11, the execution environment 21, and the execution environment 21. The execution environment 11 is provided with a communication contention management device 100. The execution environment 21 is provided with an auxiliary communication contention management device 200A, and the execution environment 22 is provided with an auxiliary communication contention management device 200B. The communication contention management device 100 and the auxiliary communication contention management devices 200A and 200B configure a communication contention management system. In addition, in the embodiment, the execution environments 11 and 12 are secure execution environments where only a reliable program is executable, while the execution environment 21 is an insecure execution environment where a program other than a reliable program is also executable without any restriction or with certain restrictions. In other words, the communication contention management device is provided in the secure execution environment and one auxiliary communication contention management device is provided in the insecure execution environment.

Basically, a connection request to the access point 50, which is made by a program being executed in each execution environment, is received by the auxiliary communication contention management device which is provided in the execution environment. The auxiliary communication contention management device which receives the connection request issues a connection request for the communication contention management device 100.

When an available connection resource 40 is present, the communication contention management device 100 permits the connection request to establish a connection to the access point 50. In addition, even when an available connection request 40 is absent, in a case where it is determined that the connection request is more preferentially connected than another connection request, the communication contention management device 100 releases the connection resource 40 in use and establishes the connection to the access point 50 corresponding to the connection request.

(2) Configuration of Communication Contention Management Device

Hereinafter, the description is given of the configuration of the communication contention management device 100 which is provided in the communication terminal 10. As shown in FIG. 1, the communication contention management device 100 includes a connection manager 101, a connection request receiving unit 103, a contention determination unit 105, a notification list manager 107, a connectable state notification unit 109, an occupancy detector 111, and an access restriction unit 113.

(2.1) Connection Manager 101

The connection manager 101 holds an active state indicating if the connection resource 40 is connectable to the access point 50. The connection manager 101 also holds an allocation state indicating the allocation of the connection resource 40 to the access point 50.

FIGS. 2A and 2B are views, each showing one example of management information which is held by the connection manager 101. The connection resource 40 is, as described above, a resource necessary for the connection to the access point (AP) of a cellular communication or a wireless LAN. The connection to AP in the cellular communication may be restricted to one AP according to the specifications of the communication terminal 10 and a communication network 60 or may be connected to two APs at the same time. The number of the APs of the wireless LAN, which are connectable at the same time, is determined by the number of wireless LAN interfaces which are implemented in the communication terminal 10.

The active state of the connection resource 40 changes according to a position of the communication terminal 10, for example. When the connection resource 40 is a wireless resource, the active state is "active" at the time of being in a communication area of the access point 50 of the wireless communication system. On the other hand, the active state is "inactive" at the time of being outside the communication area of the access point 50.

Moreover, when the connection resource 40 is a wired resource, the active state is "active" in a case where a communication cable is connected thereto, while the active state is "inactive" in a case where a communication cable is not connected thereto. Furthermore, when a user sets a radio wave off-mode (so-called flight mode) to deactivate the communication interface of the connection resource 40, the active state is also "inactive".

The connection manager 101 holds an identifier of the access point as an allocation state when the connection resource 40 is allocated to the access point 50. The identifier of the access point may be either a name or number of the access point. If the connection to the access point is disconnected by the communication terminal 10 or the communication network 60, the connection manager 101 updates the allocation state to be "not allocated".

In the embodiment, it is determined if the connection resource 40 is available when a connection request is made, on the basis of the active state of the connection resource 40 and the allocation state of the connection resource 40 to the access point 50. In other words, when the connection resource 40 is active and the connection resource 40 is not allocated to the access point 50, the connection resource 40 is available. On the other hand, when the active state is "inactive" and the connection resource 40 is allocated to the access point 50, the connection resource 40 is unavailable.

For example, in the example of FIG. 2A, a "cellular 1" is present as the connection resource 40. The active state of the "cellular 1" is "active" and the cellular 1 is allocated to APN_A. In other words, the connection resource 40 is being used and there is no other connection resource 40 which is available with respect to a new connection request.

On the other hand, in the example of FIG. 2B, a "cellular 1" and a "cellular 2" are present as the connection resource 40. The active states of the "cellular 1" and the "cellular 2" are "active". This indicates that the "cellular 1" is allocated to APN_A and the "cellular 2" is not allocated to any access point 50. In the example of FIG. 2B, a "wireless LAN" is also present as the connection resource 40. The "wireless LAN" is allocated to AP_B. In this case, this indicates that the "cellular 2" is present as the connection resource 10 which is available with respect to a new connection request. As described above, the connection manager 101 can hold the active states and the allocation states of multiple connection resources 40 supporting different communication modes.

The connection manager 101 can hold identifiers of the execution environments. In the example shown in FIG. 2B, the "cellular 1" and the "wireless LAN1" are held by the execution environment "1". In other words, this indicates that the execution environment with the identifier of "1" uses the connection.

The connection manager 101 can hold execution environment priorities showing the priority of the execution environment having issued the connection request. The connection manager 101 can also give a lower execution environment priority than that of the execution environment in which only a reliable program can be executed, to the execution environment in which even a program other than a reliable program can be executed without any restriction or with certain restrictions.

The connection manager 101 can hold the connection request priority which is defined by the access point 50 and the request timing of the connection request. It should be noted that the "connection request priority" is described later.

(2.2) Connection Request Receiving Unit 103

The connection request receiving unit 103 receives the connection requests to the access point 50 from the auxiliary communication contention management devices 200A and 200B. The connection request receiving unit 103 determines a destination based on the received connection requests. The determination of the destination means a designation of the access point 50. For example, in the case of the cellular communication, it means a designation of APN.

When the connection request has the designated access point 50 as a destination, the connection request receiving unit 103 designates the access point. On the other hand, when the access point 50 as a destination is not designated, the connection request receiving unit 103 may designate, as a destination, the access point 50 which is set as a default with respect to the execution environment of a requestor of the connection request.

The connection request receiving unit 103 may receive a connection request containing the necessity of a notification request corresponding to the connection request, an identifier of the access point 50, an identifier of the execution environment, or a connection request priority. Similarly, the connection request receiving unit 103 may receive the connection request containing a preference of the communication mode.

(2.3) Contention Determination Unit 105

The contention determination unit 105 determines whether or not to permit the connection request received by the connection manager 101, based on the active state and allocation state of the connection resource 40 being held in the connection manager 101. Specifically, the contention determination unit 105 permits the connection request when the connection resource 40 is connectable to the access point 50 and the connection resource 40 is not allocated to the access point 50. When the connection request is permitted (rejected), the contention determination unit 105 responds, as a connection response, permission (rejection) of the connection request with respect to the auxiliary communication contention management device which is a source of the connection request.

In addition, when it is determined that the connection request is permitted, the contention determination unit 105 may respond, as a connection response, the completion of the connection to the access point 50 after establishing the connection to the access point 50 in place of responding the permission of the connection request. In this case, the number of inter-VM communications can be reduced as compared with the case where the auxiliary communication contention management device which receives the response of the permission of the connection request reissues the connection request. Alternatively, when it is determined that the connection request is rejected, the contention determination unit 105 may transmit, to the auxiliary communication contention management device having issued the rejected connection request, a connectable notification containing the active state of the connection resource 40, the identifier of the access point 50 to which the connection resource 40 is allocated, or an allocation priority of the connection request for the connection resource 40.

It should be noted that contention determination unit 105 may make an inquiry to a user to confirm if the connection request is permitted. Also, the contention determination unit 105 may determine whether or not to permit a new connection request based on the execution environment priority of the execution environment in which a new connection request newly received by the connection request receiving unit 103 is issued and the execution environment priority of the execution environment in which a connection request requiring the connection resource 40 being used for the connection to the access point 50 is issued.

For example, the execution priorities of the execution environment 21 (the identifier 2) and the execution environment 22 (the identifier 3) are respectively set as "1" and "3" (see FIG. 5B). Also, the execution environment 21 requires a request of the connection request and the execution environment issues a connection request requiring the connection resource 40 being used for the connection to the access point 50. In this case, a priority of a new connection request is "1" (a priority is low) and the priority of the existing connection request is "3" (a priority is high). Thus, the new connection request is rejected.

The contention determination unit 105 may determine whether or not to permit the connection request based on the connection request priority defined by the access point 50 and the request timing of the connection request. Specifically, the contention determination unit 105 holds the priority for the access point 50 (a destination) or the priority showing that either the existing connection request (an earlier connection) or the new connection request (a later connection) is prioritized. The contention determination unit 105 can determine that either connection request is permitted according to the priorities of the access point 50 (a destination) for the earlier connection and the access point 50 (a destination) for the later connection. In other words, when the priority of the earlier connection is low, the contention determination unit 105 determines that the earlier connection is disconnected and permits the later connection. At this time, the connection to the access point may be established based on the connection request without responding the permission of the later connection and a connection response indicating a connection completion may be transmitted to the auxiliary communication contention management device. With this configuration, the responsiveness of the connection request with high priority can be improved. On the other hand, the contention determination unit 105 rejects the later connection when the priority of the later connection is low.

FIG. 3 shows a specific example of the priorities for the destinations. As shown in FIG. 3, the priorities of "1", "2", and "3" are respectively allocated to APN_A, APN_B, and APN_C. FIG. 4 shows a specific example of a communication contention management table. As shown in FIG. 9, the communication contention management table shows that either the earlier connection or the later connection is prioritized.

For example, even when a connection request for a later connection using APN_B is generated when APN_A is being connected in the earlier connection, the connection request for the later connection is rejected due to "first-come, first-served". On the other hand, even when a connection request for a later connection using APN_C is generated when APN_A is being connected in the earlier connection, the connection request for the later connection is permitted due to "last-come, first-served". Note that, when the priorities are same, an existing connection request (an earlier connection)

may be prioritized or a new connection request (a later connection) may be prioritized. Alternatively, the contention determination unit 105 may make an inquiry to a user if either connection request is prioritized.

The contention determination unit 105 may also determine whether or not to permit the connection request based on the preference of the communication mode associated with the connection request. Alternatively, the contention determination unit 105 may determine whether or not to permit the connection request based on the preference of the communication mode associated with the execution environment having issued the connection request. For example, the preference of the communication mode may be such that a wireless LAN is designated for the execution environment 1 to be used in priority to the cellular communication when both the wireless LAN and the cellular communication are available, and only a cellular communication is designated for the execution environment 2 even when the wireless LAN is also available.

(2.4) Notification List Manager 107

When the connection request is rejected by the contention determination unit 105, the notification list manager 107 adds the rejected connection request to the notification list in which the information on the connection request is held.

FIGS. 5A and 5B are views, each showing a specific example of the notification list which is held by the notification list manager 107. In the example of FIG. 5A, the connection request which is a connection request from the execution environment with the identifier 1 and whose destination is "APN_B" and priority is "3" is added to the notification list at 6:14 on Jul. 17, 2009. Similarly, in the example of FIG. 5B, two connection requests are held. The "APN_A" and "APN_B" are respectively held as destinations.

As described above, the notification list may contain an adding time when the connection request rejected by the contention determination unit 105 is added to the notification list, the execution environment priority indicating the priority of the execution environment issuing the connection request and the access point 50 designated by the connection request. The notification list manager 107 deletes the connection request from the notification list upon lapse of a predetermined timeout period after the adding time when the connection request is added to the notification list.

In addition, the notification list may contain the necessity of the notification request corresponding to the connection request and the above-described connection request priority (the earlier connection and the later connection). In this case, the notification list manager 107 adds the connection request rejected by the contention determination unit 105 based on the necessity of the notification request, the identifier of the access point 50, the identifier of the execution environment, or the connection request priority.

(2.5) Connectable State Notification Unit 109

The connectable state notification unit 109 transmits a connectable notification indicating that connection to the access point 50 is possible using the connection resource 40 to a default auxiliary communication contention management device when the connection resource 40 becomes available as a result of resolving the contention for the connection resource 40. Alternatively, a connection completion notification indicating that the connection to the access point 50 is made using the connection resource 40 may be transmitted to the auxiliary communication contention management device after the connection to the access point 50 is established according to the connection request. For example, as the default auxiliary communication contention management device, there can be designated the auxiliary communication contention management device which is provided in the execution environment requiring a constant connection.

The connectable state notification unit 109 transmits the connectable notification indicating that the connection to the access point 50 is possible using the connection resource 40 to the auxiliary communication contention management device having issued the rejected connection request based on the notification list when the connection resource 40 becomes available as a result of resolving the contention for the connection resource 40. The connectable state notification unit 109 causes the connection request to be deleted from the notification list after the connectable notification is transmitted.

The connectable state notification unit 109 may also transmit a connection completion notification indicating that the connection to the access point 50 is made using the connection resource 40 to the auxiliary communication contention management device having issued the rejected connection request when the contention for the connection resource 40 is resolved, the connection resource 40 becomes available, and the connection to the access point 50 is established according to the rejected connection request based on the notification list.

The case where the connection resource 40 becomes available means the case where the connection resource 40 being used is released by disconnecting the connection to the access point from the communication terminal 10 or the communication network 60 or the case where the communication terminal 10 moves into the communication area or a new communication interface is activated in the communication terminal 10 and the connection resource 40 is added.

The connectable state notification unit 109 can select any connection request from the multiple rejected connection requests based on any of the elapsed time period since the adding time when the connection request is added to the notification list, the execution environment priority, the connection request priority, and the access point 50. The connectable state notification unit 109 transmits a connectable notification to the auxiliary communication contention management device which is provided in the execution environment having issued the selected connection request.

When the connection resource 40 is deactivated, the connectable state notification unit 109 notifies the auxiliary communication contention management devices 200A and 200B of the deactivation of the connection resource 40 so that the issuing, of the connection request by the auxiliary communication contention management devices 200A and 200B can be suspended. On the other hand, when the connection resource 40 is activated, the connectable state notification unit 109 notifies the auxiliary communication contention management devices 2001 and 200B of the activation of the connection resource 40 so that the issuing of the connection request by the auxiliary communication contention management devices 200A and 200B can be restarted.

(2.6) Occupancy Detector 111

The occupancy detector 111 makes an inquiry to a user of the communication terminal 10 to ask whether or not to disconnect the connection to the access point 50 using the connection resource 40 when the notification list includes a connection request whose elapsed time period since the connection request is added to the notification list exceeds a predetermined time period. It should be noted that the occupancy detector 111 is not essential.

When the user instructs the connection to the access point 50 to be disconnected, the connection is disconnected and the connection resource 40 is released. On the other hand, when the user instructs the connection to be continued, the connection resource 40 is continuously used. When an inquiry to the user is made, the occupancy detector 111 does not check the elapsed time period thereafter even if the elapsed time period exceeds the predetermined time period. Alternatively, the occupancy detector 111 does not check the elapsed time period until a predetermined time period passes after the inquiry to the user is made or the communication terminal 10 is restarted.

When a notice indicating that the connection to the access point needs to be occupied is received from the auxiliary communication contention management device, the occupancy detector 111 does not make an inquiry to the user to ask whether or not to disconnect the connection to the access point. An application, such as an application to be used for downloading a multimedia file with a large capacity, which regularly occupies the connection for a long time, can give a notice indicating that the connection to the access point needs to be occupied through the auxiliary communication contention management device. With this configuration, the convenience with respect to regular applications can be improved by avoiding making an inquiry to a user to ask whether or not to disconnect the connection.

(2.7) Access Restriction Unit 113

The access restriction unit 113 holds the identifiers of the execution environments and an access restriction policy containing designation of the access point to which the execution environment is allowed to be connected or the access point to which the execution environment is prohibited from being connected and determines whether or not to permit the connection request according to the access restriction policy.

FIG. 9 shows a specific example of the access restriction policy. In the access restriction policy shown in FIG. 9, APN_B and APN_C are designated as destinations which are prohibited by the execution environment identified by the identifier 2. This is designated with a view to, for example, protecting a secure service to be provided through APN_B and APN_C because the execution environment 21 (identifier 2) is an insecure execution environment. The destination to be permitted is not particularly designated.

Thus, it is understood that the policy permits the connection to APN other than APN_B and APN_C. A free program in the insecure execution environment can freely access to APN other than APN_B and APN_C. On the other hand, the destination to be prohibited and the destination to be permitted are not designated in the execution environment 22 (identifier 3). Thus, a connection can be made freely. This means, for example, that the execution environment 3 is a secure execution environment and only a reliable program is operated therein and thus an access restriction is not particularly imposed.

(3) Configuration of Auxiliary Communication Contention Management Device

Hereinafter, the description is given of the configuration of the auxiliary communication contention management device 200A which is provided in the communication terminal 10. The auxiliary communication contention management device 200A is provided in the execution environment 21 which is different from the execution environment 11 in which the communication contention management device 100 is provided.

As shown in FIG. 1, the auxiliary communication contention management device 200A includes an AP connection request receiving unit 201, a connection response unit 203, a connection request unit 205, a connection request control unit 207, a control flag manager 209, and a control releasing unit 211. It should be noted that the auxiliary communication contention management device 200B is provided in the execution environment 22 and has the configuration same as that of the auxiliary communication contention management device 200A. Thus, only the auxiliary communication contention management device 200A is described below.

(3.1) AP Connection Request Receiving Unit 201

The AP connection request receiving unit 201 receives a connection request to the access point 50 from a program in the execution environment 21. Similarly, the AP connection request receiving unit 201 may receive a connection request containing an identifier of the access point 50.

The AP connection request receiving unit 201 can determine a connection request priority showing a priority of the received connection request. Specifically, the AP connection request receiving unit 201 determines the connection request priority of the received connection request based on the priority (see FIG. 3) for a destination (the access point 50). The AP connection request receiving unit 201 may determine the connection request priority of the received connection request based on, for example, a combination of a program type of the connection requestor and the priority, a combination of an authority of a program of the connection requestor and the priority, the fixed priority associated with the execution environment, or the priority designated by the program.

The AP connection request receiving unit 201 can hold the identifier of the access point 50 contained in the received connection request as later connection information. The "later connection information" is described later.

(3.2) Connection Response Unit 203

The connection response unit 203 transmits a connection response for the connection request to the program requiring the connection request based on a result of determination made by the connection request control unit 207 as to whether or not to issue a connection request, or a determination result as to whether the connection request is permitted or not by the communication contention management device 100. When the connection request is rejected by the connection request control unit 207, the connection response unit 203 transmits the connection response containing a reason why the connection request is rejected to the program requiring the connection request.

The connection response unit 203 receives the connectable notification from the communication contention management device 100 and transmits information on the connection request to the program requiring the connection request or the entire execution environment in which the auxiliary communication contention management device is provided based on the connectable notification. The information on the connection request is transmitted to the entire execution environment so that another program requiring the connection to the access point 50 can issue a new connection request at the timing when the connectable notification is received even when the program having issued the connection request halts the connection request.

(3.3) Connection Request Unit 205

The connection request unit 205 issues a connection request which is received by the AP connection request receiving unit 201 with respect to the communication contention management device 100. Specifically, the connection request unit 205 issues the connection request with respect to the communication contention management device 100 when the connection request control unit 207 determines that the connection request is issued.

(3.4) Connection Request Control Unit 207

The connection request control unit 207 determines whether or not to issue the connection request received by the AP connection request receiving unit 201 is issued. Specifically, the connection request control unit 207 determines whether or not to issue the connection request by referring to a control flag.

The control flag is set by the control flag manager 209 when the connection request issued by the connection request unit 205 with respect to the communication contention management device 100 is rejected. It should be noted that connection request control unit 207 may make an inquiry to a user to confirm if the connection request is rejected.

In the embodiment, the connection request control unit 207 can determine whether or not to issue the connection request based on the combination of the earlier connection information and the later connection information. It should be noted that the "earlier connection information" is described later.

Also, the connection request control unit 207 may determine whether or not to issue the connection request based on the connection request priority and the priority of the control flag. It should be noted that the priority of the control flag is described later.

The connection request control unit 207 cancels the setting of the control flag when a connectable notification is received from the communication contention management device. The connection request control unit 207 can also receive a notification indicating that the connection resource is deactivated or activated from the communication contention management device 100. When the connection resource 40 is deactivated, the connection request control unit 207 can suspend the issuing of the connection request.

(3.5) Control Flag Manager 209

The control flag manager 209 sets a control flag when the connection request issued by the connection request unit 205 is rejected by the communication contention management device 100. In addition, the control flag manager 209 can hold a flag setting time when the control flag is set.

When the connection response rejecting the connection request received from the communication contention management device 100 is received, the control flag manager 209 can set the allocation priority of the connection request to the connection resource 40 contained in the connection response as a priority of the control flag.

In the embodiment, the control flag manager 209 sets the identifier of the access point 50 to which the connection resource 40 is allocated as the earlier connection information. The control flag manager 209 can set the identifier of the access point 50 contained in the received connection request as later connection information. Specifically, the control flag manager 209 manages the communication contention management table shown in FIG. 4. As described above, even if a connection request using APN_B as a later connection is generated when the APN_A is being connected as the earlier connection, a connection request for the later connection is rejected according to "first-come, first served". On the other hand, even if a connection request for a later connection using APN_C is generated when the APN_A is being connected in the earlier connection, a connection request for the later connection is permitted according to "last-come, first-served".

(3.6) Control Releasing Unit 211

The control releasing unit 211 cancels the setting of the control flag when a time from the flag setting time when the control flag is set to the time when the AP connection request receiving unit 201 receives a new connection request reaches a predetermined timeout period.

(4) Communication Contention Management Method

Hereinafter, the description is given of communication contention management methods performed by the above-described communication contention management device 100 and the auxiliary communication contention management devices 200A and 200B. Specifically, the description is given of (4.1) Operation of Auxiliary Communication contention Management Device when Connection Request is Issued, (4.2) Operation of Communication contention Management Device when Connection Request is Issued, and (4.3) Operation of Communication contention Management Device when Contention between Connection Requests is Resolved.

Figure 6:
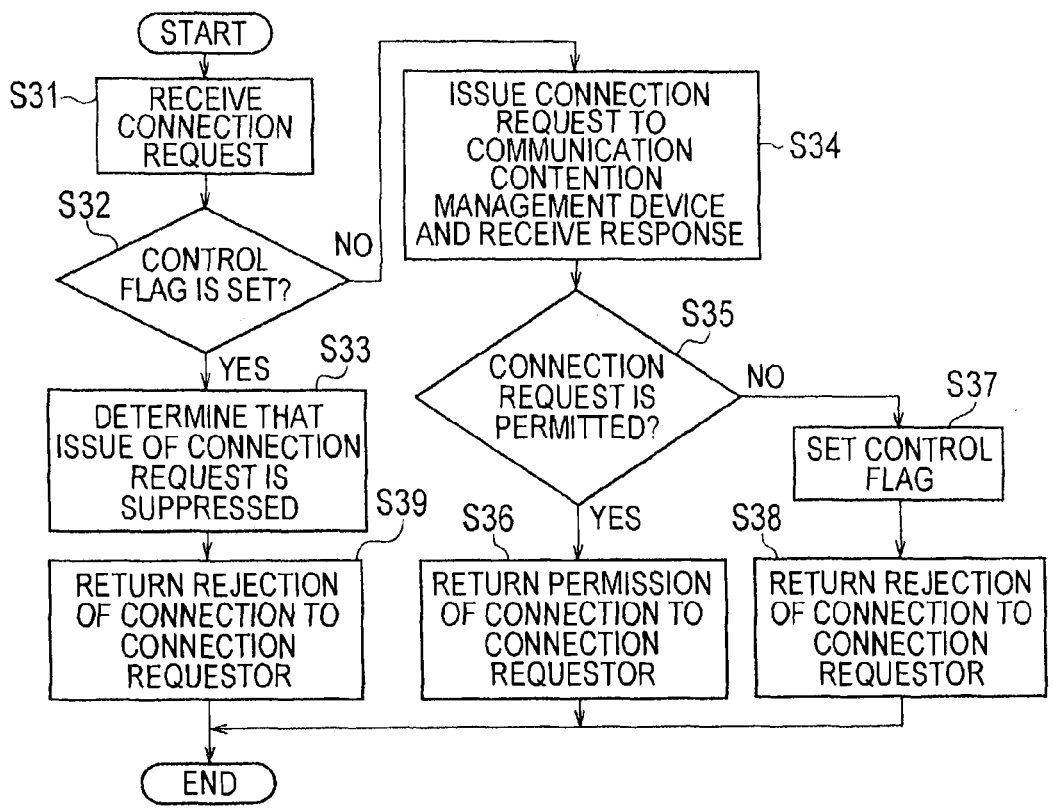
FIG. 6 is a view showing an operational flow of an auxiliary communication contention management device 200 when a connection request is issued according to the embodiment of the invention.

(4.1) Operation of Auxiliary Communication Contention Management Device when Connection Request is Issued FIG. 6 shows an operational flow of the auxiliary communication contention management device 200A when the connection request is issued. The operational flow shown in FIG. 6 is executed at the timing when a program in the execution environment 21 issues a connection request. It should be noted that the auxiliary communication contention management device 200B also executes the same operation.

At step S31, the AP connection request receiving unit 201 receives a connection request from the program in the execution environment 21.

At step S32, the connection request control unit 207 determines if a control flag is set.

When the control flag is set (YES at step S32), at step 533, the connection request control unit 207 determines that the issuing of the connection request received by the AP connection request receiving unit 201 is suspended.

At step S39, the connection response unit 203 transmits a connection response for the connection request to the program of the connection requestor and finishes the process. Specifically, the connection response unit 203 transmits the connection response indicating that the connection request is rejected to the program of the connection requestor.

When the control flag is not set (NO at step S32), at step S34, the connection request unit 205 issues the connection request which is received by the AP connection request receiving unit 201 for the communication contention management device 100 and receives a response from the communication contention management device 100.

At step S35, the connection request unit 205 determines if the issued connection request is permitted.

When the connection request is permitted (YES at step S35), at step S36, the connection response unit 203 transmits the connection response for the connection request to the program of the connection requestor and finishes the process. Specifically, the connection response unit 203 transmits the connection response indicating that the connection request is permitted to the program of the connection requestor.

When the connection request is rejected (NO at step S35), at step S37, the control flag manager 209 sets a control flag.

At step S38, the connection response unit 203 transmits the connection response for the connection request to the program of the connection requestor and finishes the process. Specifically, the connection response unit 203 transmits the connection response indicating that the connection request is rejected to the program of the connection requestor.

It should be noted that the connection request control unit 207 may perform comparison with the priority of the control flag and the connection request priority when the control flag is set. When the priority of the control flag is higher than the connection request priority, the process at step S33 is executed. Otherwise the process at step S34 is executed.

Likewise, when the control flag is set, at step S32, the connection request control unit 207 may refers to the communication contention management table (see FIG. 4) and execute a determination process based on the combination of the earlier connection information and the later connection information. Specifically, when it is designated in the communication contention management table that the earlier connection has a priority, the connection request control unit 207 executes the process at step S33 and, otherwise, executes the process at step S34.

Figure 7:
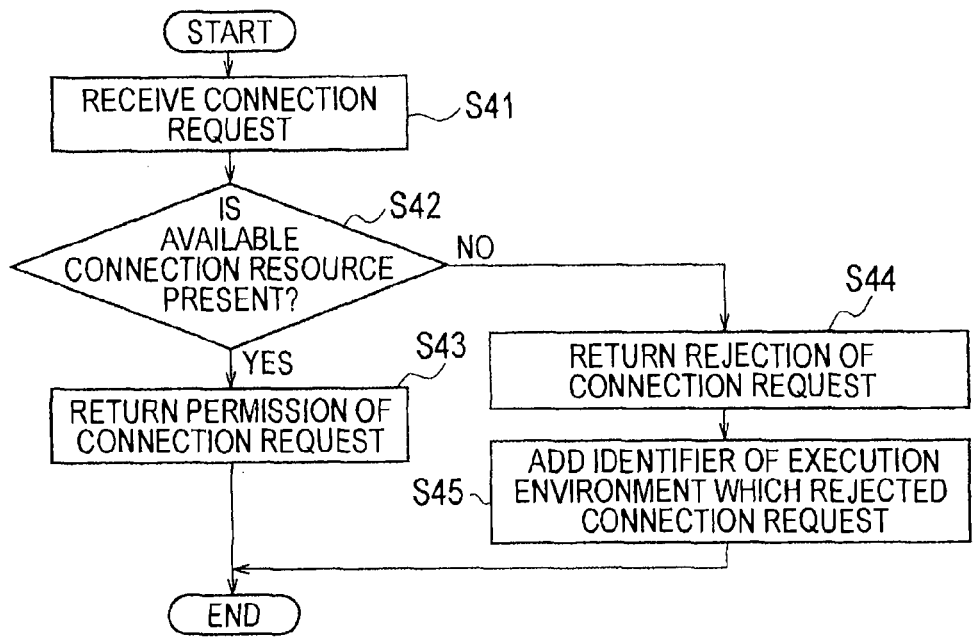
FIG. 7 is a view showing an operational flow of a communication contention management device 100 when a connection request is issued according to the embodiment of the invention.

(4.2) Operation of Communication Contention Management Device when Connection Request is Issued FIG. 7 shows an operational flow of the communication contention management device 100 when the connection request is issued. The operational flow shown in FIG. 7 is executed when the auxiliary communication contention management device 200A issues a connection request for the communication contention management device 100.

At step S91, the connection request receiving unit 103 receives a connection request from the auxiliary communication contention management device 200A.

At step S42, the contention determination unit 105 determines if an available connection resource 40 is present based on the connection request received by the connection request receiving unit 103.

When the available connection resource 90 is present (YES at step S42), at step S93, the contention determination unit 105 responds a permission of the connection request to the auxiliary communication contention management device 200A and finishes the process. At this time, the contention determination unit 105 may establish the connection to the access point 50 based on the connection request.

When the available connection resource 40 is absent (NO at step S42), at step S44, the contention determination unit 105 responds a rejection of the connection request to the auxiliary communication contention management device 200A and finishes the process.

At step S45, the notification list manager 107 adds the contents of the rejected connection request to the notification list (see FIGS. 5A and 5B) and finishes the process.

It should be noted that when the available connection resource 40 is absent (NO at step S42), the contention determination unit 105 may make an inquiry to a user to conform if the connection request is received.

Also, at step S42, the contention determination unit 105 may determine whether or not to permit a new connection request based on the execution environment priority of the execution environment having issued the new connection request newly received by the connection request receiving unit 103 and the execution environment priority of the execution environment having issued the connection request requiring the connection resource 40 being used for the connection to the access point 50.

Furthermore, at step S42, the contention determination unit 105 may determine that either connection request is permitted according to the priorities of the access point 50 (the destination) for the earlier connection and the access point 50 (The destination) for the later connection. Alternatively, at step S42, the contention determination unit 105 may refer to the communication contention management table to determine that either the earlier connection or the later connection has a higher priority, thereby determining whether or not to permit the new connection request.

Figure 8A:
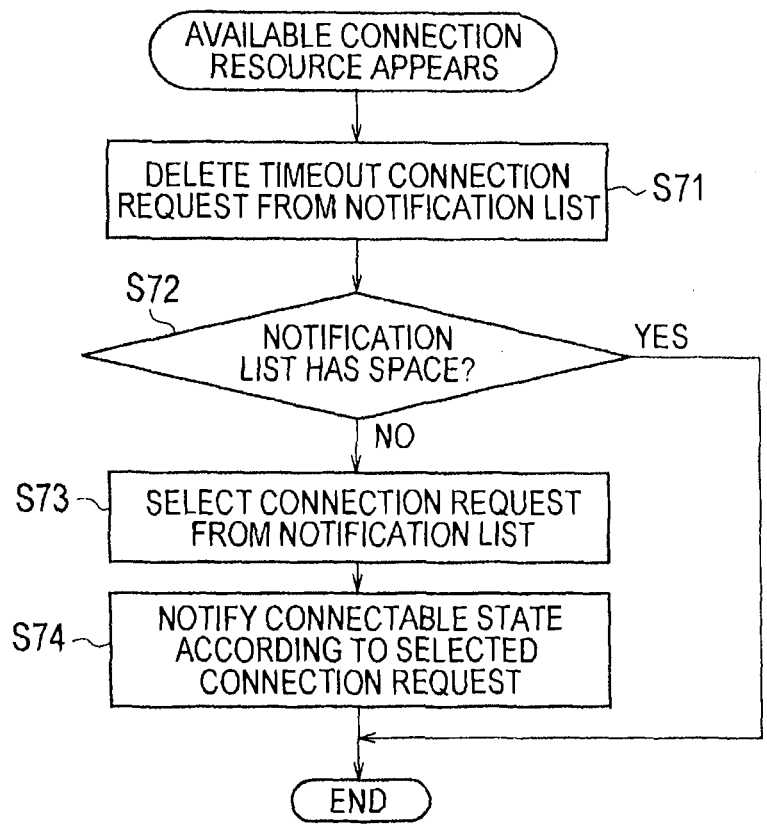
FIGS. 8A and 8B show operational flows of the communication contention management device 100 and the auxiliary communication contention management device 200 when a contention between the connection requests is resolved according to the embodiment of the invention.
Figure 8B:
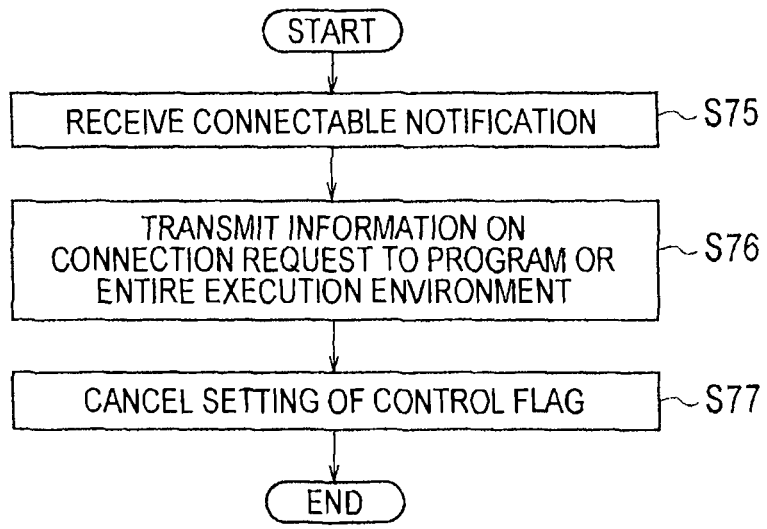

(4.3) Operation of Communication Contention Management Device When Contention between Connection Requests is Resolved FIGS. 8A and 8B show operational flows of the communication contention management device 100 and the auxiliary communication contention management device when the contention between the connection requests is resolved. The operational flows shown in FIGS. 8A and 8B are executed when an available connection resource 40 appears.

At step S71, the notification list manager 107 refers to the notification list to which the rejected connection request is added and deletes the connection request from the notification list upon lapse of a predetermined timeout period.

At step S72, the connectable state notification unit 109 determines if the notification list is empty, in other words, if an entry is present in the notification list.

When the notification list does not have a space (NO at step S72), at step S73, the connectable state notification unit 109 selects a connection request of a notification target from the notification list.

At step S74, the connectable state notification unit 109 transmits the connectable notification to the auxiliary communication contention management device (for example, the auxiliary communication contention management device 200A) which is provided in the execution environment issuing the selected connection request and finishes the process. In other words, when the connection resource 40 becomes available as a result of resolving the contention for the connection resource 40, the communication contention management device 100 transmits the connectable notification indicating that the connection to the access point 50 is possible using the connection resource 40 to the auxiliary communication contention management device having issued the rejected connection request based on the notification list.

It should be noted that the connectable state notification unit 109 can also establish the connection to the access point 50 for the rejected connection request and transmit the connectable notification indicating the completion of the connection to the access point 50.

On the other hand, when the notification list is empty (YES at step S72), the communication contention management device 100 finishes the process.

The steps after step S75 are executed when the auxiliary communication contention management device (the connection response unit 203) receives the connectable notification from the communication contention management device 100. At step S75, the connection response unit 203 receives the connectable notification.

At step S76, based on the received connectable notification, the connection response unit 203 transmits information on the connection request to the entire execution environment in which the program requiring the connection request or the auxiliary communication contention management device is provided.

At step S77, the connection request control unit 207 cancels the setting of the control flag and finishes the process.

(5) Advantageous Effects

In the above-described communication contention management system (the communication contention management device 100 and the auxiliary communication contention management devices 200A and 200B), the auxiliary communication contention management device having issued the rejected connection request is notified that the connection to the access point 50 is possible using the connection resource 40 when the access point 50 becomes available as a result of resolving the contention for the connection resource 90. The auxiliary communication contention management device determines whether or not to issue the connection request to the communication contention management device 100, by referring to the control flag set when the connection request is rejected.

For this reason, a needless changeover between the execution environments and the waste of system resources caused by the communication can be prevented in the communication terminal 10 provided with the multiple program execution environments and the connection resource 40 to be used for the connection to the access point 50 to the communication network. In other words, when the connection request is rejected, the auxiliary communication contention management device is prevented from transmitting the needless connection request to the communication contention management device 100 after the rejection, and no notification is issued to all the execution environments every time the contention state of the connection resource 40 is changed. Thus, the waste of the system resources accompanied with the transmission and the notification can be prevented.

In the embodiment, the connection request is permitted when the connection resource 40 is connectable to the access point 50 and the connection resource 40 is not allocated to the access point 50. Accordingly, the communication contention management can be achieved based on the availability of the connection resource 40 and the waste of the system resource can be further prevented.

In the embodiment, whether or not to permit the connection request is permitted is determined based on the execution environment priority indicating the priority of the execution environment, the priority of the destination (the access point 50), or the connection request priority. Accordingly, for example, a high priority is given to an important service, so that the important service can be surely executed and a service quality can be improved.

In the case of an open execution environment in which an application other than a reliable application can be executed without any restriction or with certain restrictions, there may be a case where a connection request to which a priority is invalidly given occupies the connection resource 40 and a connection request from another execution environment cannot be received at all. However, a low execution environment priority is given to the open execution environment, so that the connection resource 40 can be prevented from being occupied by the malicious software. Thus, the security of service can be improved.

Furthermore, in the embodiment, when the connection request whose elapsed time period since the rejected request is added to the notification list exceeds a predetermined time is present, the connection to the access point 50 using the connection resource 40 can be disconnected after making an inquiry to a user about the connection. Thus, even when the connection request to which a high execution environment priority is invalidly given in the open execution environment occupies the connection resource 40, the connection can be disconnected by the user's intention.

In the embodiment, the notification list manager 107 determines whether or not to add the rejected connection request to the notification list based on the necessity of the notification request, the identifier of the access point 50, the identifier of the execution environment, or the connection request priority. In addition, the connectable state notification unit 109 selects any connection request from the multiple rejected connection requests based on at least any of the elapsed time period since the rejected connection request is added to the notification list, the execution environment priority, the connection request priority, and the access point 50. Thereafter the connectable state notification unit 109 transmits a connectable notification to the auxiliary communication contention management device which is provided in the execution environment issuing the selected connection request. Accordingly, the waste of the system resources for the connectable notification can be further prevented.

In the embodiment, when the connection resource 40 is deactivated, the auxiliary communication contention management device is notified of the deactivation of the connection resource 40, so that the auxiliary communication contention management device stops issuing the connection request. Accordingly, the needless changeover between the execution environments and the waste of the system resources caused by the communication can be further prevented.

In the embodiment, the connectable notification can contain the identifier of the access point 50 to which the connection resource 40 is allocated or the allocation priority of the connection resource 40 to the connection request. Accordingly, the auxiliary communication contention management device can recognize the reason why the connection request is rejected and can notify the user or the program of the connection requestor of the reason. Thus, the user or the program can properly cope with the situation by, for example, executing alternative connection or service.

In the embodiment, whether or not to permit the connection request can be determined based on the preference of the communication mode associated with the connection request. Accordingly, when multiple communication modes are available, the communication mode can be selectively used according to the preference.

In the embodiment, the auxiliary communication contention management device may determine whether or not to issue the connection request based on the connection request priority and the priority of the control flag. Also, the auxiliary communication contention management device can determine whether or not to issue the connection request based on the combination of the earlier connection information and the later connection information. Accordingly, the connection request can be more carefully controlled based on these priorities.

(6) Other Embodiments

As described above, the details of the present invention have been disclosed using an embodiment of the present invention. However, it should not be understood that the description and drawings which constitute one part of this disclosure limit the invention. From this disclosure, various alternative embodiments will be apparent to a person skilled in the art.

FIG. 10 is a general block configuration diagram of a communication terminal 10A according to a modification of the present invention. The communication terminal 10A has a communication contention management device 100 which is provided in an execution environment 22. In other words, the communication contention management device 100 and an auxiliary communication contention management device 200B are provided in the same execution environment.

In the case of the communication terminal 10A, the communication contention management device 100 and the auxiliary communication contention management device 200B do not use an inter-VM communication facility 31. Thus, the load of processing the communication can be reduced. In the above-described embodiment, the connectable state notification unit 109 selects the connection request to be a target of the notification from the multiple rejected connection requests when the connection resource 40 becomes available. However, with regard to the connection request from the auxiliary communication contention management device 200B which is provided in the same execution environment, it is also possible that information is always notified to the auxiliary communication contention management device 200B.

FIG. 11 is a general block configuration diagram of a communication terminal 10B according to another modification of the present invention. Similar to the communication terminal 10A, the communication terminal 10B has a communication contention management device 100 which is provided in an execution environment 22. On the other hand, in the communication terminal 10B, an execution environment 21 is provided over the execution environment 22. In other words, a program of the execution environment 21 is executed on the execution environment 22. This configuration is referred to as a host-type virtualization terminal architecture.

In the case of the communication terminal 10B, similar to the communication terminal 10A, the communication contention management device 100 and an auxiliary communication contention management device 200B do not use an inter-VM communication facility 31. Thus, the load of processing the communication can be reduced. Moreover, similar to the communication terminal 10A, the connectable state notification unit 109 may always notify the auxiliary communication contention management device 200B of the information on the connection request from the auxiliary communication contention management device 200B.

As described above, the present invention naturally includes various embodiments which are not described herein. Accordingly, the technical scope of the invention is only defined by the particular matters contained in the scope of claims which is appropriate from the description above.

Note that the entire contents of the Japanese Patent Applications No. 2009-206420, filed on Sep. 7, 2009, and No. 2010-199198, filed on Sep. 6, 2010, are incorporated herein by reference.

What is claimed is:

1. A communication contention management device provided in a communication terminal having a plurality of program execution environments and a connection resource to an access point to a communication network, the communication contention management device comprising:
   a connection manager configured to hold an active state indicating if the connection resource is connectable to the access point and an allocation state indicating an allocation of the connection resource to the access point;
   a connection request receiving unit configured to receive a connection request to the access point from an auxiliary communication contention management device provided in a different execution environment isolated from an execution environment in which the communication contention management device is provided;
   an access restriction unit configured to hold an identifier of the execution environment and an access restriction policy containing a designation of an access point to which the execution environment is allowed to be connected or an access point to which the execution environment is prohibited from being connected, and determine whether or not to permit the connection request according to the access restriction policy; and
   a contention determination unit configured to determine whether or not to permit the connection request based on the active state and the allocation state held in the connection manager and transmit a connection response containing a determination result to the auxiliary communication contention management device.

2. The communication contention management device according to claim 1, wherein
   the communication terminal has a secure execution environment where only a reliable program is executable and an insecure execution environment where a program other than a reliable program is executable without any restriction or with a certain restriction, and
   the communication contention management device is provided in the secure execution environment and at least one auxiliary communication contention management device is provided in the insecure execution environment.

3. The communication contention management device according to claim 1, further comprising a connectable state notification unit configured to transmit a connectable notification indicating that a connection to the access point is possible using the connection resource to a predetermined auxiliary communication contention management device when the connection resource becomes available as a result of resolving a contention for the connection resource.

4. The communication contention management device according to claim 1, further comprising:
   a notification list manager configured to add the rejected connection request to a notification list when the contention determination unit rejects the connection request, the notification list including information on the connection request; and
   a connectable state notification unit configured to transmit a connectable notification indicating that a connection to the access point is possible using the connection resource to the auxiliary communication contention management device having issued the rejected connection request, based on the notification list, when the connection resource becomes available as a result of resolving a contention for the connection resource.

5. The communication contention management device according to claim 1, wherein the contention determination unit permits the connection request when the connection resource is connectable to the access point and is not allocated to the access point, establishes a connection to the access point based on the connection request, and sends the auxiliary communication contention management device the connection response indicating that an establishment of the connection to the access point is completed, and the connection manager updates the allocation state according to the establishment of the connection to the access point.

6. The communication contention management device according to claim 1, wherein
   the connection manager holds an execution environment priority indicating a priority of the execution environment having issued the connection request, and
   the contention determination unit determines whether or not to permit a new connection request newly received by the connection request receiving unit, based on the execution environment priority of the execution environment having issued the new connection request and the execution environment priority of an execution environment having issued a connection request requiring the connection resource being used for the connection to the access point.

7. The communication contention management device according to claim 6, wherein the connection manager gives an execution environment, where a program other than a reliable program is executable without any restriction or with a certain restriction, a lower execution environment priority than an execution environment priority of the execution environment where only a reliable program is executable.

8. The communication contention management device according to claim 1, wherein
   the connection manager holds a connection request priority defined by the access point and a request timing of the connection request, and
   the contention determination unit determines whether or not to permit the connection request based on the connection request priority.

9. The communication contention management device according to claim 4, wherein
   when the connection resource is deactivated, the connectable state notification unit notifies the auxiliary communication contention management device that the connection resource is deactivated and thereby causes the auxiliary communication contention management device to suspend an issue of the connection request, and when the connection resource is activated, the connectable state notification unit notifies the auxiliary communication contention management device that the connection resource is activated and thereby causes the auxiliary communication contention management device to restart an issue of the connection request.

10. The communication contention management device according to claim 1, wherein the contention determination unit sends the auxiliary communication contention management device a connection response containing an active state of the connection request, an identifier of the access point to which the connection resource is allocated, or an allocation priority of the connection resource to the connection request, when it is determined that the connection request is rejected.

11. The communication contention management device according to claim 4, wherein, when a connection to the access point is established according to the rejected connection request based on the notification list after the connection resource becomes available as a result of resolving the contention for the connection resource, the connectable state notification unit sends the auxiliary communication contention management device having issued the rejected connection request, a connection completion notification indicating that the establishment of the connection to the access point is completed using the connection resource.

12. The communication contention management device according to claim 1, wherein
the connection manager holds the active states and the allocation states of a plurality of connection resources supporting different communication modes, and
the contention determination unit determines whether or not to permit the connection request based on a preference of the communication mode associated with the connection request.

13. The communication contention management device according to claim 4, wherein
the notification list manager holds an adding time when the connection request rejected by the contention determination unit is added to the notification list,
the communication contention management device further comprising an occupancy detector configured to make an inquiry to a user of the communication terminal to ask whether or not to disconnect the connection to the access point using the connection resource, when the notification list includes a connection request whose elapsed time period after the adding time exceeds a predetermined time period.

14. The communication contention management device according to claim 13, wherein the occupancy detector halts the inquiry to the user to ask whether or not to disconnect the connection to the access point, when a notice indicating that the connection to the access point needs to be occupied is received from the auxiliary communication contention management device.

15. An auxiliary communication contention management device provided in any of program execution environments included in a communication terminal connectable to an access point to a communication network using a connection resource, the auxiliary communication contention management device comprising:
an AP connection request receiving unit configured to receive a connection request to the access point from a program in the execution environment;
a connection request control unit configured to determine whether or not to issue the connection request received by the AP connection request receiving unit by referring to a control flag set when the connection request is rejected, and cancel a setting of the control flag when a connectable notification is received from a communication contention management device provided in an execution environment different from the execution environment in which the auxiliary communication contention management device is provided;
a connection request unit configured to issue the connection request received by the AP connection request receiving unit to the communication contention management device;
a control flag manager configured to set the control flag when the connection request issued by the connection request unit is rejected by the communication contention management device;
a connection response unit configured to transmit a connection response for the connection request to the program having made the connection request based on a determination result as to whether or not to issue the connection result or a determination result as to whether the connection request is permitted by the communication contention management device.

16. The auxiliary communication contention management device according to claim 15, wherein the control flag manager holds a flag setting time when the control flag is set,
the auxiliary communication contention management device further comprising a control releasing unit configured to cancel a setting of the control flag when an elapsed time period from the flag setting time to a time when the AP connection request receiving unit newly receives the connection request reaches a predetermined timeout period.

17. The auxiliary communication contention management device according to claim 15, wherein the connection response unit receives the connectable notification from the communication contention management device and transmits information on the connection request to the program or the entire execution environment in which the auxiliary communication contention management device is provided based on the connectable notification.

18. The auxiliary communication contention management device according to claim 15, wherein
the AP connection request receiving unit holds the identifier of the access point contained in the connection request as later connection information,
the control flag manager sets the identifier of the access point to which the connection resource is allocated as earlier connection information of the control flag, and
the connection request control unit determines whether or not to issue the connection request based on a combination of the earlier connection information and the later connection information.

19. The auxiliary communication contention management device according to claim 15, wherein the connection request control unit receives a notification indicating that the connection resource is deactivated or activated from the communication contention management device and inhibits an issue of the connection request when the connection resource is deactivated.

20. A communication contention management system comprising:
an auxiliary communication contention management device provided in any of program execution environments included in a communication terminal connectable to an access point to a communication network using a connection resource; and a communication contention management device provided in an execution environment different from the execution environment in which the auxiliary communication contention management device is provided, wherein the communication contention management device comprises:

a connection manager configured to hold an active state indicating if the connection resource is connectable to the access point and an allocation state indicating an allocation of the connection resource to the access point;

a connection request receiving unit configured to receive a connection request to the access point from the auxiliary communication contention management device;

an access restriction unit configured to hold an identifier of the execution environment and an access restriction policy containing a designation of an access point to which the execution environment is allowed to be connected or an access point to which the execution environment is prohibited from being connected, and determine whether or not to permit the connection request according to the access restriction policy; and a contention determination unit configured to determine whether or not to permit the connection request based on the active state and the allocation state held in the connection manager and transmit a connection response containing a determination result to the auxiliary communication contention management device, and the auxiliary communication contention management device comprises:

an AP connection request receiving unit configured to receive a connection request to the access point from a program in the execution environment in which the auxiliary communication contention management device is provided;

a connection request control unit configured to determine whether or not to issue the connection request received by the AP connection request receiving unit by referring to a control flag set when the connection request is rejected;

a connection request unit configured to issue the connection request received by the AP connection request receiving unit to the communication contention management device provided in the execution environment different from the execution environment in which the auxiliary communication contention management device is provided;

a control flag manager configured to set the control flag when the connection request issued by the connection request unit is rejected by the communication contention management device; and a connection response unit configured to transmit a connection response for the connection request to the program having made the connection request.

21. A communication contention management method using an auxiliary communication contention management device provided in any of program execution environments included in communication terminal connectable to an access point to a communication network using a connection resource and a communication contention management device provided in an execution environment different from the execution environment in which the auxiliary communication contention management device is provided, the method comprising the steps of:

the auxiliary communication contention management device receiving a connection request to the access point from a program in the execution environment in which the auxiliary communication contention management device is provided, the communication contention management device receiving a connection request to the access point from the auxiliary communication contention management device;

the communication contention management device determining whether or not to permit the connection request according to an access restriction policy containing a designation of an access point to which the execution environment is allowed to be connected or an access point to which the execution environment is prohibited from being connected, the communication contention management device holding an identifier of the execution environment and the access restriction policy; and the communication contention management device determining whether or not to permit the connection request is permitted based on an active state indicating if the connection resource is connectable to the access point and an allocation state indicating an allocation of the connection resource to the access point, and transmitting a connection response containing a determination result to the auxiliary communication contention management device.

* * * * *